(12) United States Patent
DeBusk et al.

(10) Patent No.: US 6,650,478 B1
(45) Date of Patent: Nov. 18, 2003

(54) OPTICAL FILTER FOR A WINDOW

(75) Inventors: Steven DeBusk, Martinsville, VA (US); Peter Maschwitz, Martinsville, VA (US)

(73) Assignee: CPFilms Inc., Martinsville, VA (US)

( * ) Notice: Subject to any disclaimer, the term of this patent is extended or adjusted under 35 U.S.C. 154(b) by 0 days.

(21) Appl. No.: 09/377,777

(22) Filed: Aug. 20, 1999

(51) Int. Cl.7 .............................. G02B 1/10; G02B 5/08
(52) U.S. Cl. .................. 359/585; 359/577; 359/589; 359/359; 359/360
(58) Field of Search ............................ 359/350, 359, 359/360, 580, 585; 428/432, 213; 427/162

(56) References Cited

U.S. PATENT DOCUMENTS

| | | |
|---|---|---|
| 4,429,005 A | 1/1984 | Penn |
| 4,557,980 A | 12/1985 | Hodnett |
| 4,582,764 A | 4/1986 | Allerd |
| 4,690,871 A * | 9/1987 | Gordon et al. ............ 428/432 |
| 4,710,426 A | 12/1987 | Stephens |
| 4,799,745 A | 1/1989 | Meyer |
| 4,965,121 A * | 10/1990 | Young et al. ............ 428/213 |
| 4,973,511 A | 11/1990 | Farmer |
| 4,978,181 A | 12/1990 | Inanuma |
| 5,055,358 A | 10/1991 | Livingston |
| 5,071,206 A * | 12/1991 | Hood et al. ................ 359/360 |
| 5,085,926 A | 2/1992 | Iida |
| 5,214,530 A | 5/1993 | Coombs |
| 5,306,547 A | 4/1994 | Hood |
| 5,377,045 A | 12/1994 | Wolfe |
| 5,513,040 A | 4/1996 | Yang |
| 5,902,634 A * | 5/1999 | Maschwitz et al. ......... 427/162 |

* cited by examiner

Primary Examiner—Audrey Chang
(74) Attorney, Agent, or Firm—Bacon & Thomas

(57) ABSTRACT

An optical filter in the form of a film which can be used in a window to control the amount of absorbed light, reflected light, transmitted light and solar energy rejection. The optical filter contains a unique combination of an interfering Fabry-Perot stack and a massive Fabry-Perot stack.

20 Claims, 5 Drawing Sheets

| | |
|---|---|
| GLASS | 11 |
| MOUNTING ADHESIVE | 12 |
| UV ABSORBING POLYESTER SUBSTRATE | 13 |
| INFRARED REFLECTING METAL LAYER | 14 |
| LAMINATING ADHESIVE MASSIVE DIELECRIC | 15 |
| THINNER ABSORBING METAL LAYER | 16 |
| QUARTER WAVE OPTICAL THICKNESS INTERFERING DIELECTRIC | 17 |
| THICKER ABSORBING METAL LAYER | 18 |
| POLYESTER SUBSTRATE | 19 |
| SCRATCH RESISTANT LAYER | 20 |

FIG. 3

OPTICAL FILTER FOR A WINDOW

BACKGROUND OF THE INVENTION

I. Field of the Invention

The present invention relates to an optical filter element which controls or limits the transmission of light so that only a portion of the total incident light passes through the optical filter element thereby making the element semi-transparent. The element is typically applied or adhered to a light transmissive substrate such as polymer or glass for ultimate use in the field of window manufacturing and particularly in the manufacturing of windows where control of light (e.g., control of absorbed light, reflected light, transmitted light and solar energy rejection) is important.

II. Background Information

Windows are conventionally manufactured with solar control elements or optical filters as a component thereof in order to provide desired coloration and advantageous levels of visible light transmission (VLT), visible light reflectance (VLR), solar energy absorption and total solar energy rejection. Such optical filters are often multi-layered coatings or laminates which are used in combination with a glass sheet or other optical glass device so that the light which passes through the glass also passes through the optical device to produce the desired effects. Typically the optical filter is incorporated in or on the glass or is positioned in close proximity to the glass (such as within the gas containing space between two glass sheets in a double glazed window). The optical filter may be coated or otherwise adhered to a suitable light transmissive substrate such as a polymer in order to produce a structure for combination with the glass. For example such optical filters are conventionally coated onto or otherwise adhered to a polymeric film such as polyethylene terephthalate (PET). Such polymer/optical filter films can be combined with the glass during the manufacturing steps of making a window for residential, automotive or other architectural applications. Alternatively the polymer/optical filter film can be retrofitted onto previously manufactured windows by adhering the film thereto. Such polymer/optical filter films are known as solar control films.

Windows which include an optical filter have characteristic levels of reflection on both sides (i.e., surfaces) of the filter. Thus, such windows which are installed in the walls of a building or vehicle will have a characteristic level of interior visible reflection and exterior visible reflection. Interior visible reflection is the reflection of visible interior incident light (interior light is light which is inside the building or vehicle) while exterior visible reflection is the reflection of visible exterior incident light. (exterior light is light which is outside the building or vehicle). Optical filters which have unequal exterior and interior visible light reflection are asymmetric reflectance (dual-reflectance) filters or films. It is highly desirable to use optical filters wherein the interior visible reflection is less than the exterior visible reflection. Also it is highly desirable to keep reflectance levels to 20% or less.

When optical filters are used for residential or architectural applications such as windows, it is desirable for the filter to have certain properties. Some of these properties include color that does not change hue or shade over time (i.e., color stability); visible light reflectance on both the exterior and interior that is not perceived as "mirrored" (20% or less); visually appealing transmitted and reflected color; and the ability to significantly reduce solar heat gain (60% or greater solar energy rejection). Traditionally optical filters for windows (e.g., solar control films) are constructed either from dyed polymer film, clear polymer film coated with a single metal layer or multiple metal layers, or a hybrid structure which includes both dyed film and metallized film. However such traditional optical filters for windows do not provide all of the above desirable properties.

Dyes used in such optical filters have poor color stability and thus optical filters which contain a dyed layer will eventually fade and change color. Also, optical filters which utilize only dyed layers instead of metal layers have inferior solar heat rejection. Films with single or multiple metal layers are perceived as too reflective in the marketplace for films with visible light transmission levels of 35% or less. In other words, the problem with single or multiple layer metal films is that when the metal is thick enough to bring the light transmission to 35% or less, the visible reflectance becomes unacceptably high. The hybrid dyed/metal optical filters described above provide low visible reflectance but are still susceptible to color change and fading problems. In addition when dyed/metal films are constructed with a single dyed layer facing the window, the interior reflectance is excessive.

When optical filters, such as solar control window films, are in contact with a glass window additional thermal stress is induced into the glass. This occurs due to the fact that such filters absorb a portion of the incident solar energy. This absorbed solar energy in turn increases the temperature of the glass for the portion of the glass exposed to sunlight. This increased temperature induces additional thermal stress in the glass structure. If the thermal stress exceeds the tensile strength of the glass thermal stress breakage can occur. Thus it is imperative to produce optical filters and solar control window films which do not produce excessive thermal stress. This is accomplished by minimizing the solar absorption of such filters and films.

To minimize the occurrence of thermal stress breakage, and thus to manufacture commercially viable solar control products, the following limits of solar absorption are recommended by glass, window and solar control film manufacturers as an industrial standard:

Single-pane annealed glass: less than 65% total solar absorption

Dual-pane annealed glass: less than 50% total solar absorption

These absorption rates are measured with the optical filter applied to ⅛" clear glass. This industrial standard exists as a safeguard against thermally induced breakage. Thus it would be highly desirable to meet this standard while providing the desirable color stability and light altering characteristics. It would also be desirable to meet this standard as described above while also limiting the visible light reflectance on both surfaces of the optical filter so that a window can be produced which has an exterior and interior visible light reflectance of 25% or less.

As noted above one of the parameters which is regulated by optical filters is the amount of solar energy rejection. The term "total solar energy rejection" (TSER) is a term of art which describes the percentage of incident solar heat rejected by a glazing system relative to the incident solar radiation. The TSER value equals the solar reflectance plus the portion of the solar absorption that is both re-radiated and conducted/convected to the outdoors. The TSER is expressed as a percentage between 0 and 100%. The higher a window's TSER the less solar heat is transmits.

Total solar energy rejection may also be expressed in terms of the solar heat gain coefficient (SHGC). The SHGC represents the solar heat gain through the window system relative to the incident solar radiation. SHGC is expressed as a number between 0 and 1. The lower a window's SHGC, the less solar heat is transmits. The sum of TSER (in decimal form) and SHGC value is 1. Thus if the TSER of a specified optical filter is 65% then the SHGC is 1 minus 0.65 which equals 0.35.

SUMMARY OF THE INVENTION

It is an objective of the present invention to provide an optical filter for a window or the like which has the desirable characteristics as outlined above. In particular it is an objective of the invention to produce a colored optical. filter with color stability without the use of dyes.

It is another objective of this invention to produce a color stable optical filter that provides increased or high levels of total solar energy rejection with reduced interior and exterior visible reflectance as compared to single or multiple layer metal films.

It is a further objective of this invention to provide a color stable optical filter with reduced interior and exterior visible reflectance as compared to existing commercially available all-metal asymmetric reflectance (dual-reflectance) optical filters.

It is also an objective of this invention to accomplish the above objectives for dark optical filters (where VLT is 5% to 25%) while maintaining total solar energy rejection at a level of at least 60% and maintaining exterior and interior visible reflectance at 20% or below.

It is also an objective of the present invention to accomplish one or more of the above objectives in an optical filter in which the interior visible light reflectance is less than the exterior visible light reflectance.

It is also an objective of the present invention to produce a neutral colored optical filter which has neutral transmitted color and neutral reflected color from both the exterior and the interior.

These and other objectives which will become apparent in the disclosure of the invention are accomplished by combining an interference Fabry-Perot interference structure with a massive Fabry-Perot structure in a single optical filter. The interference Fabry-Perot structure is a multi-layered stack containing the layers: metal/interfering dielectric/metal. The massive Fabry-Perot structure is a multi-layered stack containing the layers: metal/massive dielectric/metal.

The optical filter which contains the combination of an interference Fabry-Perot structure and a massive Fabry-Perot structure is advantageously adhered to a suitable substrate of the type which is conventionally used in solar control films, except, as noted above, no dye is required in the film. For example the metal/interfering dielectric/metal layers may be sequentially coated onto the substrate to form the structure "substrate/first metal/interfering dielectric/second metal". Conventional coating techniques such as sputtering and/or vacuum evaporation may be used to sequentially apply the coatings onto the substrate.

The massive Fabry-Perot structure is applied directly onto the interference Fabry-Perot structure. Advantageously one of the metal layers of the interference structure is used as a metal layer in the massive Fabry-Perot structure. In other words, one metal layer in the optical filter is shared by both the interference Fabry-Perot stack and the massive Fabry-Perot stack. Such an optical filter adhered to a substrate will have the layers: substrate/metal/interfering dielectric/metal/massive dielectric/metal. The metal between the interfering dielectric and the massive dielectric is shared by both the interference Fabry-Perot structure and the massive Fabry-Perot structure so that the interfering Fabry-Perot structure in the optical filter has the layers: metal/interfering dielectric/metal and the massive Fabry-Perot structure has the layers: metal/massive dielectric/metal although the entire optical filter requires only three metal layers therein.

One advantage of the above structure which shares a metal layer between the two Fabry-Perot structures is that the unshared metal of the massive dielectric can be directly laminated onto the interfering Fabry-Perot structure through the use of an adhesive which also functions as the massive dielectric layer. Adhesives which can function in this manner are dielectric adhesives. The ability to apply the massive Fabry-Perot structure to the interfering Fabry-Perot stack is advantageous because lamination is easier and less costly than coating methodologies such as sputtering.

At least one of the three metal layers is an absorbing metal layer ($M_a$) and at least one of the three metal layers is an infrared reflecting layer ($M_{ir}$). The third metal may be either an absorbing metal layer or an infrared reflecting layer. Such films have desirable visible light reflection and visible light transmission characteristics. Preferably the stack has the structure: $M_a$/interfering dielectric/$M_a$/massive dielectric/$M_{ir}$.

Either side of the stack may be adhered to the substrate. Thus there are two possible structures for the above preferred stack which includes the substrate. These are: substrate/$M_a$/interfering dielectric/$M_a$/massive dielectric/$M_{ir}$ and the structure $M_a$/interfering. dielectric/$M_a$/massive dielectric/$M_{ir}$/substrate. In these structures the interfering Fabry-Perot structure has the layers $M_a$/interfering dielectric/$M_a$ and the massive Fabry-Perot structure has the layers $M_a$/massive dielectric/$M_{ir}$.

Thermal stress and undesirable reflectance are minimized by employing layers of unequal thickness (i.e., asymmetric structural design) in the interference Fabry-Perot structure and, in particular, thermal stress and undesirable reflectance are minimized advantageously by employing two absorbing metal layers of unequal thickness in the interference Fabry-Perot portion of the optical filter. The thickness ratio of the thicker absorbing metal layer to the thinner absorbing metal layer is greatest in dark optical filters and the ratio is diminished to approximately 1:1 in an optical filter which has a visible light transmission of 35% or more. To produce a 35% VLT design, the two absorbing metal layers are extremely thin such that the thinness approaches the limits on how thin these particular metal layers can be manufactured. Accordingly, there are limits as to the maximum VLT for the optical filters which are manufactured in accordance with this invention. For practical purposes, the filters of this invention will have a maximum VLT value of approximately 50%.

Suitable substrate materials include PET and glass. Both the substrate and the multi-layered structure of the optical filter may be covered with conventional materials which are known in this field of technology. For example, polyvinyl butyrate (PVB) or an adhesive may be used to cover the substrate. Suitable materials for covering the multi-layered structure on the side opposite the substrate include PET, PVB, hardcoats and adhesives. PVB is conventionally used in safety glass laminates.

Fenestration constructions which may include the optical filter of this invention include the following:
1. Glass in a PVB laminate (glass substrate/optical filter stack/PVB/glass)
2. Film in a PVB laminate (glass/PVB/film substrate such as polymer/optical filter stack/PVB)

3. Film suspended in an insulated glass unit (glass/air-space/substrate film/optical filter stack/air-space/glass)
4. Film adhered to a glass surface (e.g., standard retrofit solar control film or low-e retrofit solar control film).

Although metal layers are used to make the optical filter of this invention, various nonmetallic elements and metal compounds as further described herein may be used in place of the metals.

Reference is made herein to neutral color both with respect to transmitted color and reflected color. The colors described as being suitable in this invention, and in particular, the neutral transmitted color and neutral reflected colors established in this invention are measured by the color measurement specification established by the Commission International de L'Eclairage. This method for color measurement measures the quantities L*, a* and b*. The relevant parameters for the color used in the present invention are the values a* and b* in the CIE L*, a*, b* method for color measurement.

The transmitted color which is desired for the optical filter of the present invention has an a*value of −3 to +1 and a b* value of −6 to 2. The reflected color (interior or exterior) for the optical filters of this invention has an a* value of −4 to 0.5 and a b* value of −4 to 6.

Reference is made herein to dark, medium and light optical filters. Dark filters have visible light transmissions of 5%–25%. Medium filters have visible light transmissions of 26%–45%. Light filters have visible light transmission of more than 45%.

BRIEF DESCRIPTION OF THE DRAWINGS

FIG. 3 is a cross-sectional representation of a preferred embodiment of the optical element of this invention which has been mounted onto glass.

Figure 4:
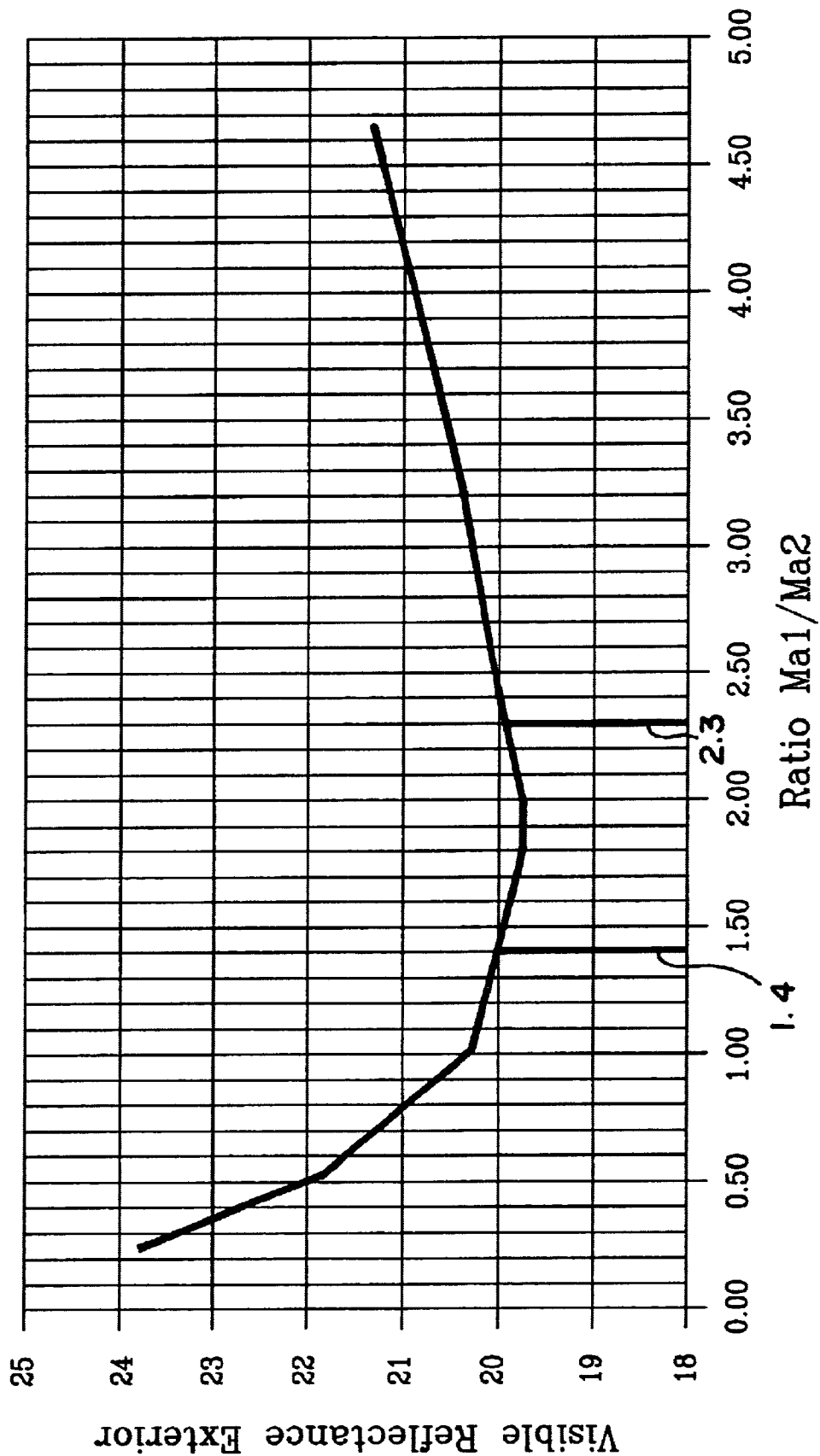
FIG. 4 is a graph which shows the relationship between exterior visible reflectance and the thickness ratio of the two absorbing metal layers.
Figure 5:
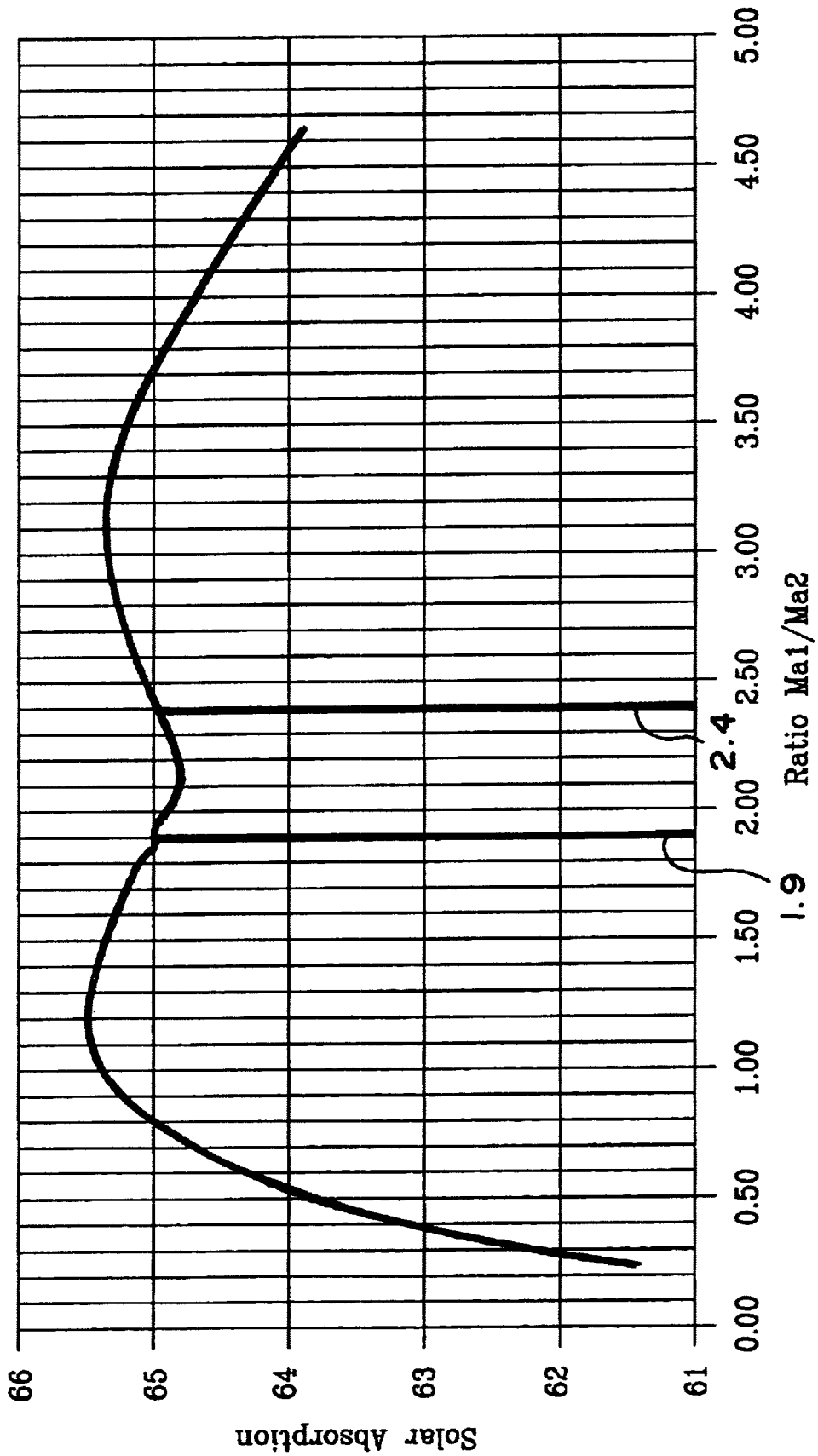
FIG. 5 is a graph which shows the relationship between solar absorption and the thickness ratio of the two absorbing metal layers.
Figure 6:
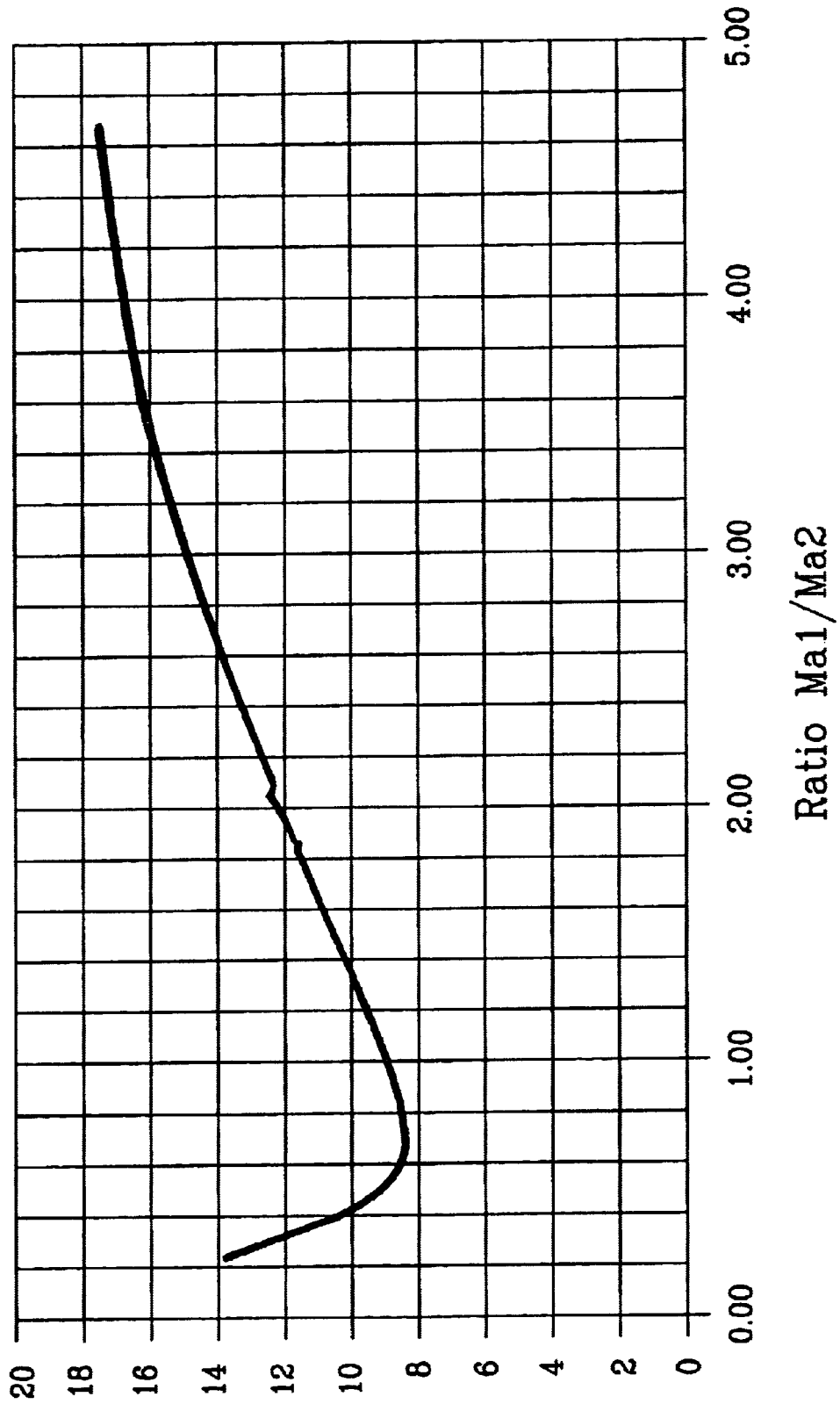
FIG. 6 is a graph which shows the relationship between interior visible reflectance and the ratio of the two absorbing metal layers.

The data used to generate FIGS. 4, 5 and 6 was obtained for an embodiment of this invention which has a visible light transmission of 15% (dark optical filter).

DETAILED DESCRIPTION OF THE INVENTION AND PREFERRED EMBODIMENTS

Figure 1:
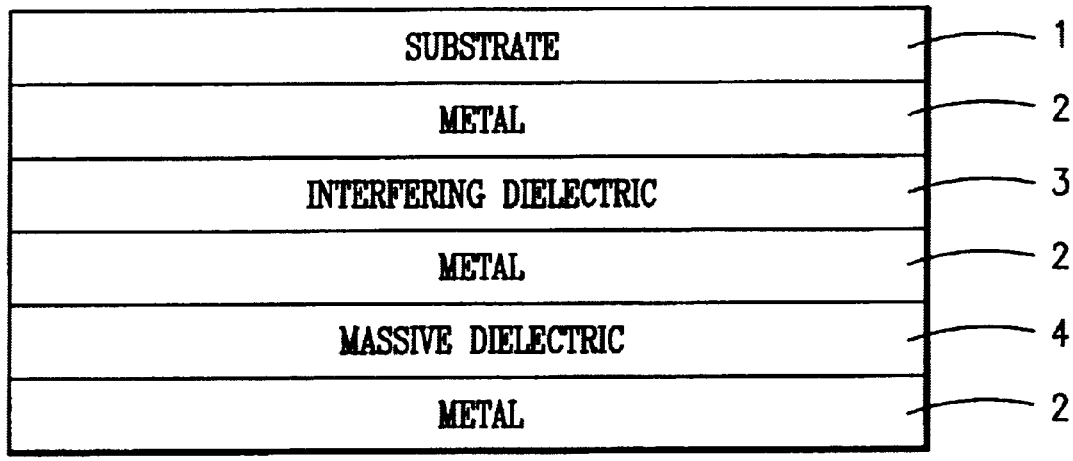
FIGS. 1 and 2 are cross-sectional representations of the layers contained in the optical elements of this invention.

FIG. 1 shows The structure: substrate/metal/interfering dielectric/metal/massive dielectric/metal. The embodiment shown in FIG. 1 includes substrate 1 which is adhered to a multi-layered stack containing three metal layers (each of which are identified by reference numeral 2), an interfering dielectric layer 3 and a massive dielectric layer 4. The interfering dielectric layer 3 along with the two metal layers in contact with the interfering dielectric on either side thereof form the interfering Fabry-Perot stack. The massive dielectric along with the two metal layers in contact with the massive dielectric on either side thereof form the massive Fabry-Perot stack. Thus, the metal layer situated between the interfering dielectric layer and the massive dielectric layer is used in both the interfering Fabry-Perot stack and the massive Fabry-Perot stack.

Figure 2:
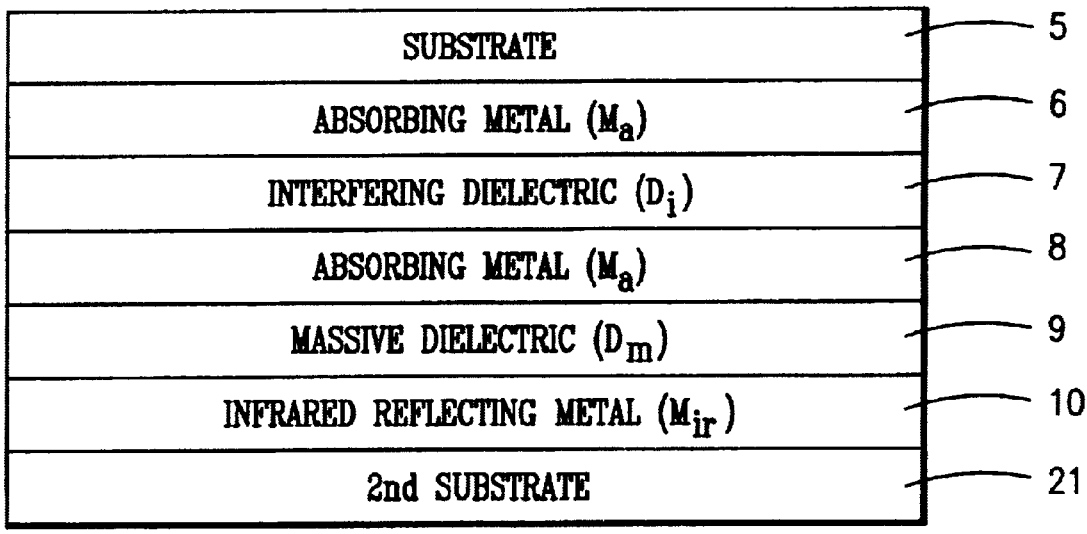

In a preferred embodiment the two metals which are used to form the interfering Fabry-Perot stack are absorbing metals and the third metal which is not in contact with the interfering dielectric layer is an infrared reflecting metal. Such an embodiment is shown in FIG. 2 which includes substrate 5, absorbing metal layer 6 interfering dielectric layer 7, absorbing metal layer 8, massive dielectric layer 9 and infrared reflecting metal layer 10. In the embodiment shown in FIG. 2, layers 6, 7 and 8 define the interfering Fabry-Perot stack and layers 8, 9 and 10 define the massive Fabry-Perot stack.

In a preferred embodiment the metal layer which is shared by both the interference Fabry-Perot stack and the massive Fabry-Perot stack is thinner than the other metal which is in contact with the interfering dielectric layer. For example, in this preferred embodiment layer 8 is thinner than layer 6.

The embodiment shown in FIG. 2 may be made by sequentially coating layers 6, 7 and 8 onto the substrate to form a subassembly having layers 5, 6, 7 and 8 as shown in FIG. 2. Another subassembly may be formed containing massive dielectric 9 and infrared reflecting layer 10. The subassembly containing the massive dielectric layer may then be adhered to the subassembly containing layers 5, 6, 7 and 8 by a conventional lamination procedure to form the structure shown in FIG. 2. The embodiment shown in FIG. 2 also includes a second substrate 21 which is preferably a UV absorbing PET substrate. The second substrate 21 provides additional UV absorbing characteristics to the optical filter and also serves as a convenient substrate for manufacturing the subassembly containing the massive dielectric layer 9 and the infrared reflecting layer 10. Thus, the subassembly containing the massive dielectric layer 9 and infrared reflecting layer 10 may be conveniently made by sequentially depositing the infrared reflecting metal layer 10 and the massive dielectric layer 9 onto the second substrate to form a subassembly having the layers massive dielectric/infrared reflecting metal/second substrate. This subassembly may then be adhered to the other subassembly containing layers 5, 6, 7 and 8.

Another preferred embodiment is shown in FIG. 3. FIG. 3 shows a multi-layered optical filter having layers 13–20 which is mounted onto a glass sheet 11 by means of mounting adhesive layer 12. It is to be noted that the multi-layered optical filter includes a UV absorbing polyester substrate layer 13 and a polyester substrate layer 19 as well as a scratch resistant layer 20 which is in contact with polyester substrate 19. Also, the embodiment shown in FIG. 3 includes absorbing metal layer 16 which is thinner than absorbing metal layer 18. The embodiment shown in FIG. 3 also utilizes a laminating adhesive for use as the massive dielectric layer. Thus the embodiment shown in FIG. 3 may be made by coating infrared-reflecting metal layer 14 onto the UV absorbing polyester substrate 13 to form a subassembly containing layers 13 and 14; forming another subassembly by sequentially coating the polyester substrate 19 with layers 18, 17 and 16; adhering the two subassemblies together through the use of a laminating adhesive which serves as the massive dielectric layer to thereby form an assembly having layers 13–19; and applying the assembly having layers 13–19 to the glass through the use of mounting adhesive 12. At some point during the process scratch resistant layer 20 is applied to the polyester substrate layer 19.

The embodiment of FIG. 3 is preferably made by the process described below.

The first step is to produce the interfering Fabry-Perot stack on a suitable substrate such as the PET film layer shown as layer 19 in FIG. 3. Typically a 1 mil (0.001") clear PET film is used for this purpose although other thicknesses may be used. The thicker absorbing metal layer 18, the quarter wave optical thickness interfering dielectric layer 17 and the thinner absorbing metal layer 16 are deposited sequentially onto substrate 19 by a single passage through the vacuum chamber of a vacuum coating device. Layers 18 and 16 are deposited by sputter deposition, while layer 17 is deposited using a linear evaporation source. The sputter deposition and linear evaporation sources are situated inside the vacuum chamber so as to deposit the thicker absorbing metal layer first, the interfering dielectric second and the thinner absorbing metal layer last. This first step produces the substrate/absorbing metal/interfering dielectric/absorbing metal interfering Fabry-Perot subassembly consisting of layers 16, 17, 18 and 19.

In a separate process, the infrared-reflecting metal layer 14 is deposited onto a second substrate layer 13. Layer 14 is deposited using conventional coating techniques such as evaporation deposition in a vacuum chamber or sputtering. Layer 13 consists of a clear ½ mil to 1 mil PET film (although other film thicknesses may be used) impregnated with UV absorbing chemicals (e.g., benzotriazols or benzophenones) that provide UV protection for the entire film structure to prevent film degradation from solar UV exposure. This process produces part of the massive Fabry-Perot stack and completes the second subassembly consisting of layers 13 and 14.

The above two subassemblies are laminated together using a polyester resin adhesive applied by roller coating, gravure or similar methods. A coating thickness of approximately 1.3 to 1.8 microns is used. This lamination process completes the massive Fabry-Perot stack (metal/massive dielectric/metal) consisting of layers 14, 15 and 16 and simultaneously produces the combination of interfering and massive Fabry-Perot stacks.

The above-described process forms the desired optical filter of this invention which includes the combination of interfering and massive Fabry-Perot stacks. The remaining process steps described below are used to form a solar control window film product with the above-described solar control film.

After the last lamination step described above, a UV-cured acrylate resin is applied to the exposed surface of layer 19. This acrylate resin forms layer 20 which is commonly referred to as a "scratch-resistant" or "SR coating".

This acrylate resin is preferably applied with a catalyst/initiator to promote curing or hardening of the SR coating. The acrylate resin is applied using roller coating or gravure methods or the like. A coating thickness of approximately 1.5 to 2 microns is used. The formulation and process for application of this SR coating is covered in U.S. Pat. No. 4,557,980, the specification of which is incorporated herein.

Following the application of the SR coating, a mounting adhesive 12 is used to adhere the solar control film to the window glass by applying the mounting adhesive to the film. This is accomplished using roller coating, gravure or similar methods. Suitable mounting adhesives include conventional polyester resin with silane end-groups and pressure sensitive acrylic resin adhesive. An example of a suitable polyester resin adhesive is the polyester resin adhesive described in U.S. Pat. No. 4,429,005, the specification of which is incorporated herein by reference. When the polyester resin is used it is advantageously coated at approximately 1.2 to 1.5 pounds per ream thickness. When the acrylic pressure sensitive resin is used it is advantageously coated at approximately 4 pounds per ream. The mounting adhesive is coated onto the exposed surface of layer 13. As the mounting adhesive is coated onto the exposed surface of layer 13, a protective release liner is laminated onto the exposed side of the mounting device. This protective release liner is removed from the film structure before the film is applied to glass in retrofit applications.

If the film is to be used as a suspended film in an insulated glass unit or as a layer within a laminated glass structure, neither the SR coating or mounting adhesive and release liner would be applied.

The embodiments of this invention, and particularly the embodiments shown in FIG. 3 is advantageously made to produce a 15% visible light transmission design (a dark optical filter) or a 35% visible light transmission design (medium optical filter). The thicknesses of the metal layers used in the 15% design and the 35% design are shown below in table 1. The absorbing metal in table 1 is Hastelloy C276 and the IR reflecting metal is aluminum. It must be kept in mind that a range is shown for the metal layer thicknesses and corresponding visible light transmissions due to manufacturing tolerances. The target is the midpoint of the range, with a +/-2% variation used for the range.

TABLE 1

| Design | Thickness, nm | Light Transmission at 550 nm when deposited on clear 1 mil PET |
|---|---|---|
| 15% Design | | |
| "Thicker" Absorbing Metal | 9.6 to 11.1 | 38 to 42% |
| "Thinner" Absorbing Metal | 5.6 to 6.5 | 53 to 57% |
| Infrared Reflecting Metal | 3.15 to 3.6 | 48 to 52.5% |
| 35% Design | | |
| "Thicker" Absorbing Metal | 2.3 to 3 | 71 to 75% |
| "Thinner" Absorbing Metal | 2.3 to 3 | 71 to 75% |
| Infrared Reflecting Metal | 3.6 to 4 | 44 to 48% |

The embodiment shown in FIG. 3 includes a glass sheet thereby making the article suitable for the manufacture of a window. Such a window is advantageously installed with glass layer 11 facing the exterior of the building or room in which the window is installed and with the scratch resistant layer 20 facing the interior of the room or building. Accordingly in such an installation light within the building or room which is incident to the structure shown in FIG. 3 will have a characteristic interior visible light reflection. Likewise outside light which is incident to the structure of FIG. 3 will have a characteristic exterior visible light reflection. The embodiment shown in FIG. 3 is particularly advantageous because it has a low visible reflectance side which faces the interior.

The use of a single infrared-reflecting metal layer is advantageous because it minimizes solar energy absorption of the film structure to levels acceptable for single-pane annealed glass (to minimize the risk of thermal shock fracture). Also, by controlling the ratio of the thickness of the infrared-reflecting metal layer to the total thickness of absorbing metal layers reduces exterior visible reflectance to acceptable levels while maximizing solar energy rejection and minimizing solar energy absorption.

In addition, the combined interfering Fabry-Perot stack and massive Fabry-Perot stack in a single optical filter as described herein allows reduction of the exterior visible reflectance to a level which is not achieved when a polymer substrate which is not part of a Fabry-Perot stack is interposed between the interfering Fabry-Perot stack and the massive Fabry-Perot stack. However, the above-noted reduction in the exterior visible reflectance can be achieved when the massive dielectric layer constitutes a polymeric material which is able to function as a massive dielectric.

Desirable color is achieved without the use of a dye in accordance with the present invention. However, control of the relative thickness of the two metal absorbing layers (as well as materials which can be substituted therefore) is advantageously controlled to minimize the visible reflectance so as to minimize the undesirable mirrored look of the final product. In other words the ratio of the thickness of the two metal absorbing layers is controlled to minimize visible reflectance so as to avoid the undesired mirrored look. In addition, this same ratio is also controlled to minimize the solar absorption value to reduce the likelihood of thermal stress breakage. The ratio is controlled so that the absorbing metal layer situated between the interfering dielectric layer and the massive dielectric layer is thinner than the other absorbing metal layer. Thus, for example, absorbing metal layer 8 would be thinner than absorbing metal layer 6 in the embodiment shown in FIG. 2.

The preferred ratio for a design having a VLT level of 30% or less is elucidated by the data contained in FIGS. 4, 5 and 6.

FIG. 4 shows the relationship between the exterior visible reflectance and the thickness ratio $M_{a1}/M_{a2}$ (wherein $M_{a2}$ is the thinner absorbing metal layer between the interfering dielectric and massive dielectric layers and $M_{a1}$ is the other absorbing metal layer in the optical filter.

FIG. 5 shows the relationship between solar absorption and the thickness ratio of $M_{a1}/M_{a2}$ (wherein $M_{a1}$ and $M_{a2}$ have the same meanings as described with respect to FIG. 4.

FIG. 6 shows the relationship between interior visible reflectance and the same ratio $M_{a1}/M_{a2}$. With reference to FIG. 4, it will be noted that a minimum exterior reflectance (for the 15% visible light transmission design) is achieved when the ratio of absorbing metal layer thicknesses is from 1.4 to 2.3.

As noted above, a second important property for solar control films is to minimize the solar absorption so as to reduce the likelihood of thermal stress breakage. For single-pane windows the maximum value is approximately 65%. As shown in FIG. 2, in order to obtain an absorption of 65% or less, the ratio of absorbing metal layer thicknesses must be from 1.9 to 2.4.

In order to control the likelihood of thermal stress breakage simultaneously while minimizing exterior reflectance, it is self-evident from FIGS. 4 and 5 that the acceptable range of the ratios is 1.9 to 2.3.

It will also be noted from the information contained in FIG. 6 that in order to minimize the interior visible reflectance, the ratio needs to be as small as possible for the range of 1.9 to 2.3. Thus, in order to minimize interior visible reflectance while also minimizing the likelihood of thermal stress breakage and minimizing exterior reflectance, it is desirable to select a ratio within the range of 1.9 to 2.3 which is as small as possible.

It will be appreciated that the multi-layered optical filter of the present invention is in the form of a film and the competitive advantages of such window films with stable color, high heat rejection (above 60%) and visible interior: and exterior reflectance below 20% are significant. The asymmetry between the exterior reflectance and interior visible reflectance with interior VLR less than exterior VLR is also advantageous to the consumer since it provides improved viewing ability from inside to outside, especially at night. Prior art solar control window films currently available do not provide this combination of properties. For example, a sample was produced which has a 15% visible light transmission, 19% visible light reflectance (VLR) exterior, 16% VLR interior, and 68% total solar energy rejection. No color stable film is known to exist that combines these desirable performance and visual properties. Furthermore, the above sample contained no dye.

Modeling of higher VLT films (35%) indicates that these films will exhibit a significant reduction in exterior and/or interior visible light reflectance, and in some cases increased solar heat rejection when compared to existing neutral and dual-reflectance films. It should be noted that neutral and medium dual-reflectance light transmission films comprise the majority of commercial and residential solar control film sales. As such, the 35% design embodied in this invention will be of significant value in the solar control film marketplace.

The infrared-reflecting metal ($M_{ir}$) is preferably silver, gold, aluminum, copper or nickel or an alloy of silver, gold, aluminum or copper. Examples of preferred alloys include silver, copper and silver gold alloys. Preferably the $M_{ir}$ is pure metal or metal alloy.

The infrared reflective metal is preferably deposited using either vacuum sputtering or vacuum evaporation techniques which are well known to those skilled in the art. It is preferred that silver, gold, copper or alloys thereof be applied to achieve a thickness of 5–40 nm when these metals or alloys are used as the $M_{ir}$ layer. The preferred thickness for nickel is 2–40 nm. Aluminum or an alloy thereof is preferably used within a range of 1–15 nm. With respect to aluminum it has been observed that when aluminum is used for the $M_{ir}$ layer to produce an overall (i.e., through all the layers of the optical element) 15% visible light transmission, the aluminum layer should be 3.2 to 3.6 nm. It has been observed that the aluminum layer oxidizes prior to lamination from reaction with air which increases the VLT such that when laminated the effective visible transmission of the aluminum layer is 55% when measured at 550 nm. In the embodiment that has an overall 35% VLT, the aluminum layer thickness should be in the range of 3.6 to 4 nm.

The absorbing metal layer may be formed from an absorbing metal or alloy, an absorbing metal compound or from certain nonmetal elements. Preferred metals and alloys for forming the absorbing metal layer and the thicknesses thereof are as follows:

alloys of nickel (2–40 nm)

titanium or alloys thereof (2–50 nm) preferably pure titanium or alloy thereof stainless steel (2–40 nm)

The absorbing metal may be deposited using either vacuum sputtering or vacuum evaporation techniques which are well known to those skilled in the art. A particularly preferred material for making the absorbing metal layer is a nickel based alloy such as Hastelloy C276. The composition and properties of Hastelloy C276 are described in U.S. Pat. No. 5,902,634, the specification of which is incorporated herein.

Hastelloy C 276 has the following mechanical properties: UTI tensil psi: 106,000; yield psi: 43,000; elontg % 71.0. Hastelloy C 276 has the following chemical analysis:

| Hastelloy C 276 | |
|---|---|
| element | % by weight |
| C | .004 |
| Fe | 5.31 |
| Mo | 15.42 |
| Mn | 0.48 |
| Co | 1.70 |
| Cr | 15.40 |
| Si | .02 |
| S | .004 |
| P | .005 |
| W | 3.39 |
| V | 0.16 |
| Ni | Balance |

In a preferred embodiment the Hastelloy alloy is sputtered onto a PET substrate to a thickness of 10.25 nm (40% VLT at 550 nm). With an expected process variation of plus or minus 2% VLT gives a target thickness of 9.6–11 nm. The Hastelloy layer sputtered over the interference dielectric has a target VLT of 55% (6 nm) when sputtered onto clear PET. Again, allowing for normal process variability of 2% plus or minus gives a second Hastelloy C276 thickness range of 5.6–6.5 nm.

Suitable metal compounds for forming the absorbing metal layer include silicides and nitrides formed from Ti, Nb, Ta, or W.

Suitable non-metal elements for forming the absorbing metal layer includes silicon and germanium. A suitable nonmetal compound is silicon carbide.

The interfering dielectric layer and the massive dielectric layer are spacers which are used in the Fabry-Perot optical stack. A Fabry-Perot optical spacer is the dielectric which separates two metal or substantially absorbing layers. The metal/dielectric/metal stack forms a resonant cavity which functions as a spectrally selective absorber of light energy. The wavelengths absorbed depend primarily on the thickness of the dielectric spacer. Typically the spacer material is a substantially non-absorbing material such as a metal oxide or polymer.

The interference dielectric spacer used in the present invention is a Fabry-Perot spacer which is thin, flat and parallel enough to cause optical interference between light waves reflecting from the two surfaces of the spacer. For the purposes of this invention which generally requires neutral colored reflectance, this spacer is between 0.5 to 2 optical quarter waves thick (QWOT) at a wavelength of 550 nm. Preferably this spacer is about 1.0 QWOT.

Performance of the combination Fabry-Perot structure is apparently insensitive to variations in the refractive index of the interfering dielectric being used. Models show similar performance and transmitted and reflected colors for refractive index range of 1.3 to 2.4, preferably 1.4–2.0. In a preferred embodiment the interfering dielectric material and the massive dielectric material has a refractive index of about 1.5.

The interfering dielectric spacer may be clear to slightly absorbing with an extinction coefficient from 0.0 to 0.2.

Typical materials which can be used to make the interfering dielectric spacer include oxides of Mg, Al, Si, Ti, Cr, Zn, Zr, Nb, Mo, In, Sn, Sb, Ta, W, or Bi, SiN or mixtures of these materials or polymer coatings from vacuum evaporation. The interfering dielectric is preferably deposited using either vacuum reactive-sputtering or vacuum evaporation methodologies which are well known to those skilled in the art.

A preferred interfering dielectric material is silicon dioxide ($SiO_2$) which is applied to a thickness of about 1.0 QWOT or 89 nm.

The massive Fabry-Perot spacer utilized in this invention is a substantially transparent dielectric which may exhibit dual properties of a non-interfering (optically massive) optical layer and an optically interfering layer.

For the purposes of this invention, the layer must be sufficiently thick that the interference effects create multiple Fabry-Perot type absorption bands through the visible wavelengths. These absorption bands should be numerous enough so that the eye cannot resolve individual bands. In this way, the desirable neutral reflectance color is created by the eye averaging the many spectral peaks and valleys in the visible reflectance spectrum and perceiving the reflection as neutral. The minimum thickness for this effect is about 7 quarter waves optical thickness and preferably 9 or more quarter waves. In terms of physical thickness, the massive spacer is typically greater than 0.7 microns thick. A preferred massive dielectric material is a polyester resin which is used as the laminating adhesive for laminating PET films. The actual thickness utilized in a preferred embodiment is approximately 1.5 microns with a normal variability of 1.3 to 1.8 microns.

The optically massive characteristics (lack of interference effects) of this polymer spacer layer are caused by its relatively large thickness for an optical layer and the existence of some non-flatness in either surface of the polymer layer. These physical features tend to blur the interference effects giving the layer its massive type optical properties. It is possible to use a layer of PET film in conjunction with the laminating adhesive. If the massive spacer includes a 12 to 25 micron thick polymer film as well as the thinner adhesive layer, the optical interference effects of the massive spacer are almost eliminated. Such a structure would have the layers: substrate/metal/interfering dielectric/metal/laminating adhesive/PET film/metal.

Compared to commercially available color-stable solar control films produced with absorbing metals but without the use of the Fabry-Perot stack technique, solar control films produced according to the present invention provide for one or more of the following improvements, all of which provide significant marketing advantages:

1. Reduced visible reflectance on both exterior and interior surfaces.
2. For visible light transmissions above approximately 20%, improved solar energy rejection properties (reduced solar heat gain coefficient and shading coefficient)
3. Asymmetric visible reflectance properties with interior visible reflectance less than exterior visible reflectance.

Solar control devices produced using the method of this invention provide significant advantages compared to commercially available color-stable solar control optical elements produced with infrared reflecting metals but without the use of the Fabry-Perot stack technique used herein. These advantages include:

1. Reduced visible reflectance on both exterior and interior surfaces
2. Asymmetric visible reflectance properties with interior visible reflectance less than exterior visible reflectance Solar control elements produced using the method of this invention provide for additional improvements compared to color stable solar control elements produced using a single interfering Fabry-Perot stack (metal/interfering dielectric/metal). These improvements provide for the following advantages:

1. For visible light transmissions of approximately 30% or less, reduced solar energy absorption to permit installation of these films on single-pane annealed glass without the inherent risk of thermal stress breakage for films with greater solar energy absorption, thus making these films commercially viable for single-paned windows.
2. For visible light transmission of approximately 35% or greater, reduced solar energy absorption to permit installation of these films on dual-pane annealed glass without the inherent risk of thermal stress breakage for films with greater solar energy absorption, thus making these films commercially viable for insulated glass windows.
3. For all visible light transmissions, improved solar energy rejection properties (reduced solar heat gain coefficient and shading coefficient).

The optical filters produced using the method of this invention provide for additional improvements compared to color stable solar control elements produced using a single massive Fabry-Perot stack (metal/massive dielectric/metal). As a result of these improvements the present invention provides, for all visible light transmissions, reduced visible reflectance on both exterior and interior surfaces.

What is claimed is:

1. A multi-layered optical filter for a window which comprises the layer sequence:

first metal or metal compound/first dielectric/second metal or metal compound/second dielectric/third metal or metal compound wherein the layers:

first metal or metal compound/first dielectric/second metal or metal compound constitute a first stack which is an interference Fabry-Perot stack wherein said first dielectric is configured to function as an interfering dielectric within said Fabry-Perot stack, and the layers:

second metal or metal compound/second dielectric/third metal or metal compound constitute a second stack wherein said second dielectric is configured so that said second stack provides a reflection which is perceived as neutral and said second dielectric is a layer which is laminated to said second metal or metal compound of said first stack;

said second metal or metal compound being shared by said interference Fabry-Perot stack and said second stack; said layer sequence being adhered to a transparent substrate; and one of said first, second, and third metal or metal compound layers being a solar energy absorbing metal or metal compound layer; one of said first, second and third metal or metal compound layers being an infrared reflecting metal layer and one of said first, second and third metal or metal compound layers being either a solar energy absorbing metal or metal compound layer or an infrared reflecting metal layer.

2. The optical filter of claim 1 wherein said solar energy absorbing metal or metal compound is replaced with a solar energy absorbing nonmetal selected from the group consisting of silicon and germanium or is replaced with silicon carbide.

3. The optical filter of claim 1 wherein said solar energy absorbing metal compound is a silicide or nitride formed from a metal selected from the group consisting of Ti, Nb, Ta and W.

4. The optical filter of claim 1 wherein one of said first, second and third metal or metal compound layers is a solar energy absorbing metal layer; one of said first, second and third metal or metal compound layers is an infrared reflecting metal layer; and one of said first, second and third metal or metal compound layers is either a solar energy absorbing metal layer or an infrared reflecting metal layer.

5. The optical filter of claim 4 wherein said first and second metal or metal compound layers are solar energy absorbing metal layers and said third metal or metal compound layer is an infrared reflecting metal layer so that said optical filter has the layer sequence:

first absorbing metal/first dielectric/second absorbing metal/second dielectric/infrared reflecting metal.

6. The optical filter of claim 5 wherein said first and second absorbing metal layers are metal selected from the group consisting of nickel alloy, titanium, titanium alloy and stainless steel; and said infrared reflecting metal is selected from the group consisting of silver, gold, aluminum, copper, nickel, silver alloy, gold alloy, aluminum alloy and copper alloy.

7. The optical filter of claim 6 wherein the first dielectric layer is clear to partially absorbing with an extinction coefficient of 0.0 to 0.2 and said first dielectric is an oxide of a metal selected from the group consisting of Mg, Al, Si, Ti, Cr, Zn, Zr, Nb, Mo, In, Sn, Sb, Ta, W, or Bi or is SiN.

8. The optical filter of claim 7 wherein the second dielectric is a polyester resin adhesive or is a dual layered structure having a polyester resin adhesive layer and a layer of polyethylene terephthalate film; said transparent substrate is a polyethylene terephthalate film having first and second surfaces wherein said first surface is adhered to said first absorbing metal and said optical filter further includes a transparent UV absorbing polyester film adhered to said infrared reflecting metal laxer.

9. The optical filter of claim 8 which further includes a scratch resistant layer adhered to the second surface of said polyethylene terephthalate substrate.

10. The optical filter of claim 9 wherein the first absorbing metal layer is thicker than said second absorbing metal layer with the ratio of the thicker absorbing metal layer to the thinner absorbing metal layer being 1.9–2.3 and said optical filter has an overall visible light transmission of 30% or less.

11. The optical filter of claim 10 wherein the thicker absorbing metal layer has a thickness of 9.6 to 11.1 nm; the thinner absorbing metal layer has a thickness of 5.6 to 6.5 nm; the infrared reflecting metal layer has a thickness of 3.15 to 3.6 mm; said optical filter has a visible light transmission of 15%; said infrared reflecting metal is aluminum and said absorbing metal consists of:

| | | |
|---|---|---|
| C | .004 | wt. percent |
| Fe | 5.31 | wt. percent |
| Mo | 15.42 | wt. percent |
| Mn | 0.48 | wt. percent |
| Co | 1.70 | wt. percent |
| Cr | 15.40 | wt. percent |
| Si | .02 | wt. percent |
| S | .004 | wt. percent |
| P | .005 | wt. percent |
| W | 3.39 | wt. percent |
| V | 0.16 | wt. percent |
| Ni | Balance | wt. percent. |

12. The optical filter of claim 11 which is secured to a glass sheet with an adhesive layer between said filter and said glass sheet.

13. The optical filter of claim 9 which is secured to a glass sheet with an adhesive layer between said filter and said glass sheet.

14. The optical filter of claim 9 wherein said first and second absorbing metal layers are of about equal thickness in a range of 2.3 to 3 nm; said infrared reflecting metal layer has a thickness of 3.6 to 4 nm; said optical filter has a visible light transmission of 35%; said infrared reflecting metal is aluminum and said absorbing metal consists of:

| | | |
|---|---|---|
| C | .004 | wt. percent |
| Fe | 5.31 | wt. percent |
| Mo | 15.42 | wt. percent |
| Mn | 0.48 | wt. percent |
| Co | 1.70 | wt. percent |
| Cr | 15.40 | wt. percent |
| Si | .02 | wt. percent |
| S | .004 | wt. percent |
| P | .005 | wt. percent |
| W | 3.39 | wt. percent |
| V | 0.16 | wt. percent |
| Ni | Balance | wt. percent. |

15. The optical filter of claim 14 which is secured to a glass sheet with an adhesive layer between said filter and said glass sheet.

16. The optical filter of claim 8 which is laminated to a layer of polyvinyl butyrate.

17. A multi-layered optical filter for a window which comprises the layer sequence:
first metal or metal compound/first dielectric/second metal or metal compound/second dielectric/third metal or metal compound wherein the layers:
first metal or metal compound/first dielectric/second metal or metal compound constitute a first stack which is an interference Fabry-Perot stack wherein said first dielectric is configured to function as an interfering dielectric within said Fabry-Perot stack, and the layers:
second metal or metal compound/second dielectric/third metal or metal compound constitute a second stack wherein said second dielectric has a thickness greater than 0.7 microns;
said second metal or metal compound being shared by said interference Fabry-Perot stack and said second stack; said layer sequence being adhered to a transparent substrate; and one of said first, second, and third metal or metal compound layers being a solar energy absorbing metal or metal compound layer; one of said first, second and third metal or metal compound layers being an infrared reflecting metal layer and one of said first, second and third metal or metal compound layers being either a solar energy absorbing metal or metal compound layer or an infrared reflecting metal layer.

18. The optical filter of claim 17 wherein said second dielectric has a thickness of 1.3 to 1.8 microns.

19. A multi-layered optical filter for a window which comprises the layer sequence:
first metal or metal compound/first dielectric/second metal or metal compound/second dielectric/third metal or metal compound wherein the layers:
first metal or metal compound/first dielectric/second metal or metal compound constitute a first stack which is an interference Fabry-Perot stack wherein said first dielectric is configured to function as an interfering dielectric within said Fabry-Perot stack, and the layers:
second metal or metal compound/second dielectric/third metal or metal compound constitute a second stack wherein said second dielectric has a quarter wave optical thickness of at least 7;
said second metal or metal compound being shared by said interference Fabry-Perot stack and said second stack; said layer sequence being adhered to a transparent substrate; and one of said first, second, and third metal or metal compound layers being a solar energy absorbing metal or metal compound layer; one of said first, second and third metal or metal compound layers being an infrared reflecting metal layer and one of said first, second and third metal or metal compound layers being either a solar energy absorbing metal or metal compound layer or an infrared reflecting metal layer.

20. The optical filter of claim 19 wherein said second dielectric has a quarter wave optical thickness of at least 9.

* * * * *